Aug. 30, 1955         S. C. COLLINS         2,716,333
METHOD AND MEANS FOR TREATING GASES
Filed April 11, 1946         2 Sheets-Sheet 2
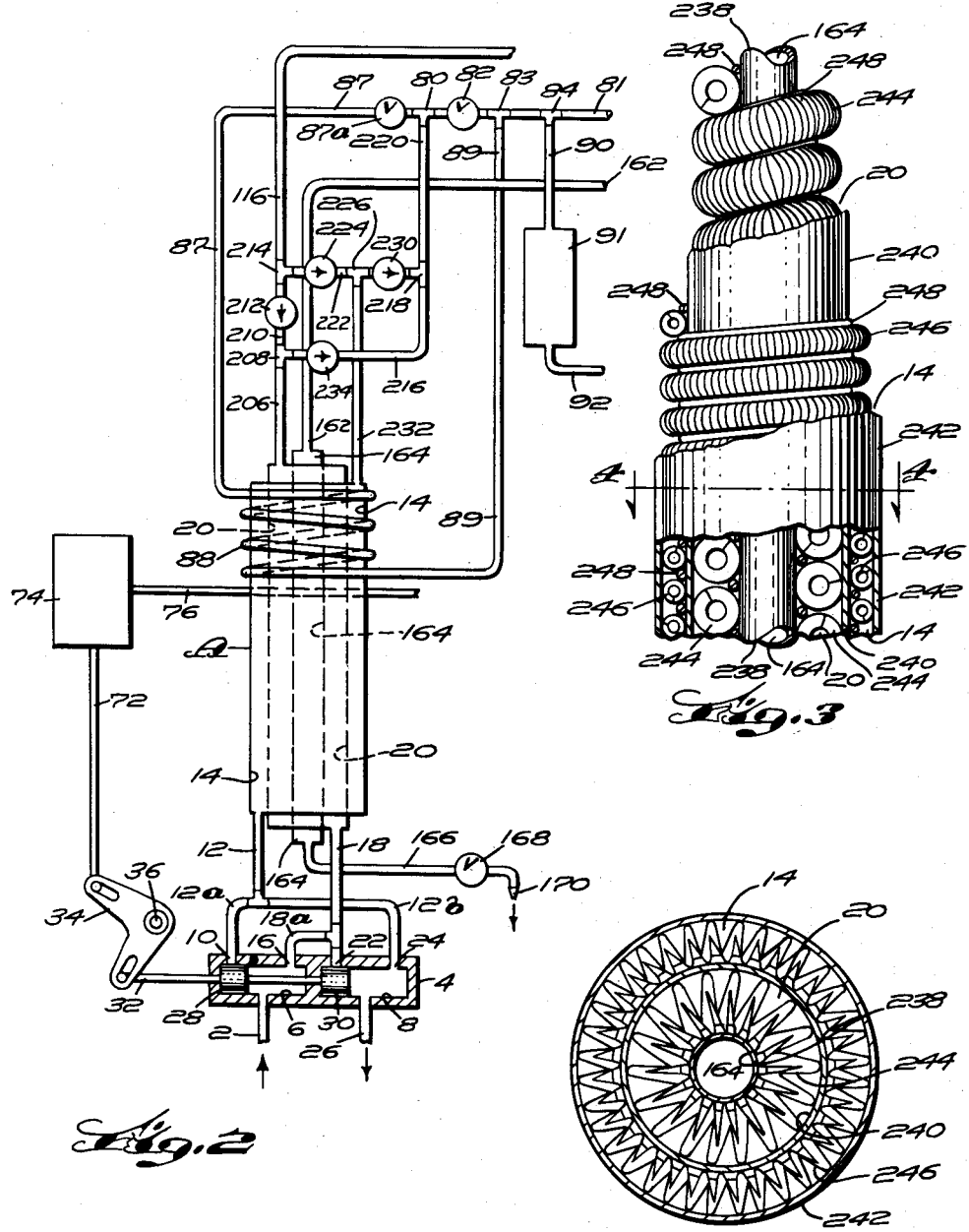
INVENTOR.
Samuel C. Collins
BY
Harry Dexter Peck
Attorney United States Patent Office 2,716,333
Patented Aug. 30, 1955

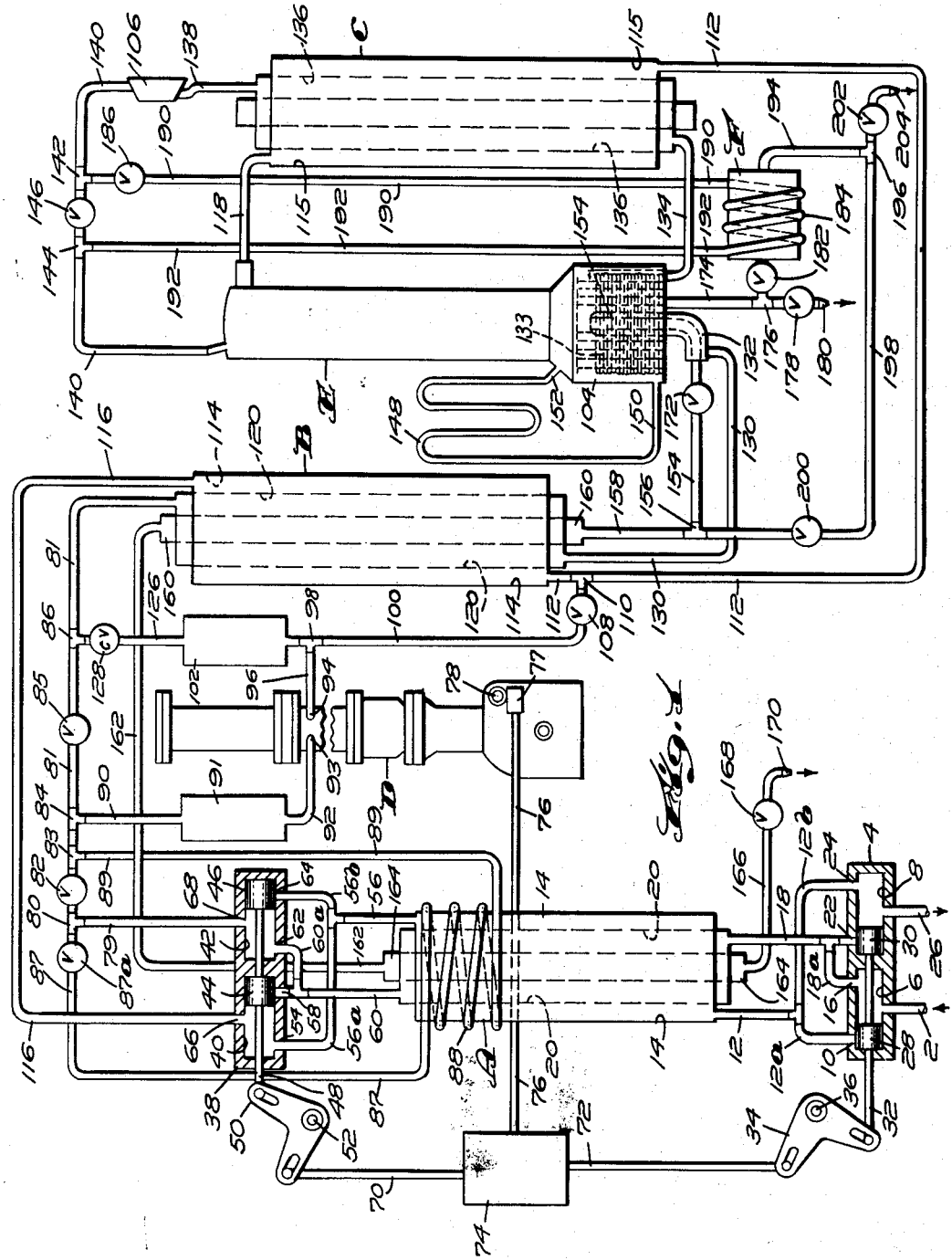

2,716,333

METHOD AND MEANS FOR TREATING GASES

Samuel C. Collins, Watertown, Mass., assignor, by mesne assignments, to Arthur D. Little, Inc., Cambridge, Mass., a corporation of Massachusetts Application April 11, 1946, Serial No. 661,253

10 Claims. (Cl. 62—123)

This invention relates to improvements in a method and means for treating gases. It is herein particularly described in its application to the production of substantially pure oxygen from air but this is merely illustrative because the process and apparatus disclosed may be used with various gases to be processed such as air, blast furnace gas, water gas, coke oven gas and other manufactured gases, to produce especially desired products such as oxygen, nitrogen, argon, helium, hydrogen, carbon dioxide and other gases. In some uses the desired product may be produced in the gaseous state and in other uses a liquid may be the end product.

It is among the objects of the invention to provide simple, compact and lightweight apparatus which can be permanently installed in some fixed location or on various vehicles such as aircraft, ships, railroad cars and trucks, or which can be mounted on a portable base and readily moved about to locations where its use may be more or less temporary. It is a feature of both the improved process and apparatus that in the treatment of a gas certain minor condensable components thereof are caused to be condensed and thereby separated from the remainder by heat transfer so that later these separated components may be recovered, if desired, or caused to be discharged so as not to prevent the attainment of the purity sought in the end product.

For example, when the apparatus is used in the production of a pure gas from impure gases, the latter are first compressed and subjected to thermal conditions which effect the depositions of certain undesired components during the initial flow of the impure gases. Later by a novel interchange of flow, these deposited components are removed and discharged with the waste gases resulting from the production of the desired pure gas. In another example, the gases to be processed may flow to a reaction chamber, such as a fractionating column or the like, wherein is produced the desired product and also waste gases which normally carry off some of the desired product. These waste gases may be so heat treated as to cause the desired product contained therein to be separated from the remainder of the waste gases and deposited so that by a similar novel interchange of flow the deposits will be picked up by the entering gases to be processed and returned to the reaction chamber. In one example the gases to be processed are cleaned and the undesired components taken from it are discharged with the waste gases and thereby prevented from contaminating the pure product desired. In the other example the desired components are reclaimed from the waste gases and returned to the chamber in which the desired product is being separated from the gases to be processed.

In still another example, where it is desired to enrich a gaseous mixture with some of its minor condensable components, the gaseous mixture is compressed and cooled to effect depositions of the condensable components during the initial flow of the compressed gaseous mixture. Later by a novel interchange of flow, a portion of the processed gas, at a substantially lower pressure, evaporates the deposits and consequently becomes enriched with the condensable components.

In the specific embodiment of the invention illustrated herein it is a feature of the invention that compressed air at a relatively low pressure is all passed in a single stream of flow through a heat exchanger, an expander, a second heat exchanger, the boiler of a fractionating column and thence through a third heat exchanger, all suitably connected in series, and finally admitted to the top of the column for purposes of rectification. It is also a feature that the waste products or effluent from the column are passed in reversed direction of flow through the third heat exchanger, the second heat exchanger and finally through the first heat exchanger. It is in the latter exchanger that the novel interchange of flows occurs whereby during one period the incoming compressed air moves through one passageway while the effluent is moving in a counterdirection of flow through an adjacent passageway, and then during the next period the flows of the air and effluent are interchanged so that each fluid moves through the passageway in which the other fluid has just previously been flowing.

The provision of apparatus capable of producing substantially pure oxygen from low pressure compressed air effects a desired saving in the power expended in compressing air to the higher pressures heretofore deemed essential, enables the apparatus to be much lighter in weight than apparatus previously employed, and reduces both the original cost and the expense of operation and maintenance.

For purposes of simplification in disclosure the accompanying drawings show diagrammatically the apparatus as a whole, and in addition show the details of a preferred form of heat exchanger which enables the improved process to be efficiently practiced.

In the drawings:

Fig. 1 is a diagrammatic layout of apparatus embodying the improved means for practicing the improved method in accordance with the present invention;

Fig. 2 is a partial diagrammatic layout showing modified means for effecting the novel interchange of flow;

Fig. 3 shows a section of the preferred form of heat exchanger, a portion being in medial section, a portion in full side view, and other portions in full side view but with parts removed; and Fig. 4 is a cross-sectional view of the heat exchanger taken as on line 4—4 of Fig. 3.

The apparatus disclosed will be described as it may be used for the production from atmospheric air of pure oxygen, either in the gaseous or liquid state. It is to be understood, however, that the invention contemplates the use of the invention in connection with other raw gases from which various desired products are to be obtained.

The separation of oxygen from air is accomplished by reducing the air to liquid form and distilling this liquid in a fractionating column. Since the normal boiling point of oxygen is about 90° K. (Kelvin) or about —297° F. (Fahrenheit) it is obvious that in the production of oxygen from air the problem is primarily one of refrigeration. Ordinarily the lower the temperature the greater the cost per unit of refrigeration. To efficiently utilize refrigeration the apparatus of the present invention comprises three counterflow heat exchangers A, B and C arranged in series with an expander D interposed between the first and second exchangers and with a fractionating or rectifying column E interconnected with both the second and third exchangers. With these elements thus arranged in series the incoming air flows in a continuous stream to the top of the column and the waste gases from the column counterflow through the three heat exchangers. Thus in each exchanger the heat possessed by the air is effectively transferred to the waste gases so that the air arrives at the top of the distilling column as liquid air and the waste gases leave the apparatus at about room temperature. When the apparatus is used for making gaseous oxygen, this gas is also passed through the second and first heat exchangers to enhance the thermal effectiveness of these units.

For a more complete understanding of the performance of the apparatus it should be said that there are three distinct periods which occur from the starting of the apparatus to its oxygen producing operation. These are known as the cooling-down period, the liquefaction period and the distillation period. During the cooling-down period the temperatures of the various parts of the apparatus are reduced to their proper operating levels. During the liquefaction period a charge of liquid air sufficient for rectification is produced. During the distillation period the desired substantially pure oxygen is continuously produced for discharge from the apparatus.

The flow of the air during the initial cooling-down period will now be described. When starting up compressed air at from 150 to 175 pounds per square inch (p. s. i.) and at ordinary room temperature is brought to an air inlet 2 of a valve casing 4 having two valve chambers 6 and 8 separated by a medial partition. The chamber 6 has an outlet 10 connected to a branch 12a of a pipe 12 that leads to an outer annular passageway 14 through the first heat exchanger A. Chamber 6 has another outlet 16 connected by a branch 18a of a pipe 18 that leads to an inner annular passageway 20 of the same heat exchanger. The chamber 8 has an inlet 22 connected with pipe 18 and another inlet 24 connected by a branch 12b with pipe 12. The chamber 8 also has an outlet 26. In each chamber is a piston valve 28 and 30 respectively, secured to a common piston rod 32 which extends from the casing to a bell crank 34 pivotally mounted at 36. When the valves 28 and 30 are at the left end of their respective chambers 6 and 8, the inlet 2 and the outlet 16 of chamber 6 are open while the outlet 10 is closed. Simultaneously in chamber 8, the inlet 22 is closed while the inlet 24 and outlet 26 are open. When the valves are shifted to the right ends of the chambers, the inlet 2 and outlet 10 of chamber 6 are open and outlet 16 is closed, while in chamber 8 the inlet 22 and outlet 26 are open and inlet 24 is closed.

Beyond the first heat exchanger is shown, in Fig. 1, another valve casing 38 similar to the valve casing 4. This has two valve chambers 40 and 42 in which are piston valves 44 and 46 secured to a piston rod 48 that connects with a bell crank 50 pivotally mounted at 52. Chamber 40 has an outlet 54 connected by a branch 56a and a pipe 56 with passageway 14 of the heat exchanger A and has an outlet 58 connected by a pipe 60 with passageway 20 of this same heat exchanger. Chamber 42 has an inlet 62 connected by branch 60a of pipe 60 with the passageway 20 of the heat exchanger A and has another inlet 64 connected by branch 56b of pipe 56 with the passageway 14 of the exchanger. Chamber 40 also has an inlet 66 and chamber 42 also has an outlet 68.

The bell crank 34 for the lower piston valves 28 and 30 and the bell crank 50 for the upper piston valves 44 and 46 are both connected by rods 70 and 72 with a suitable reversing mechanism 74 which is actuated by a shaft 76 having a worm and gear connection 77 with a shaft 78 of the expansion engine D. As the latter shaft turns continuously the reversing mechanism acts to translate this rotary motion into reciprocations of the rods 70 and 72 so that when the valves 28 and 30 of casing 4 are shifted from the left end to the right end of their strokes, the valves 44 and 46 of casing 38 will be shifted simultaneously from the right to the left ends of their stroke, and vice versa. The purpose and effect of this periodic shifting of the several valves will be appreciated as the description develops.

With valves positioned as shown in full lines in Fig. 1, the compressed air flows from inlet 2 through chamber 6, outlet 16, branch 18a and pipe 18 into passageway 20 of the heat exchanger A. From this passageway the air moves on through pipe 60 and branch 60a into valve chamber 42. From this chamber the air flows in a pipe 79 to a T 80 in a pipe 81. This pipe 81 contains besides the T 80, a valve 82, T's 83 and 84, another valve 85 and still another T 86 from which the pipe 81 continues to the second heat exchanger B. From the T 80 an auxiliary circuit, containing a valve 87a extends through a pipe 87, a coil 88 and a pipe 89 back to the T 83. The purpose and function of this auxiliary circuit will be explained later. For the moment let it be said that when starting up the valve 82 is wide open so that the air leaving the heat exchanger A passes directly through the T 80, the valve 82 and the T 83 to T 84. Despite the fact that valve 85 is also open the air does not flow beyond T 84 in pipe 81 during the cooling down period, but flows through a pipe 90 to a surge chamber 91 which is connected by a pipe 92 with the inlet 93 of the expansion engine D. The details of a preferred form of expansion engine are shown in a copending application Serial No. 665,206, filed by me on April 26, 1946, now U. S. Patent 2,607,322. Suffice it to say here that suitable valves and mechanism are provided for admitting the air to the expander, permitting it to do the work therein and then, at greatly reduced temperature and pressure, exhausting the air from the engine outlet 94 through a pipe 96 to another T 98 in a pipe 100.

When the apparatus is producing oxygen, that is during the distillation period, all the air from the expander D reaching the T flows thence through a second tank 102 into the second heat exchanger B, from which it goes into a boiler 104 in the bottom of the fractionating column E, where it is liquefied, and thence moves onward through the third heat exchanger C to be expanded by a suitable device 106 (either in the form of an expansion valve, as indicated in the drawings, or a suitable length of capillary tubing) and eventually is admitted into the top of the column E. During the cooling-down period, however, the air flow is different because the expansion valve 106 is then kept closed. This prevents any flow of air from the T 98 in the manner just described for the distillation period.

During the cooling-down period the air reaching the T 98 moves onward through the pipe 100, past an open valve 108 therein, to a T 110 in a pipe 112 which extends between an outer annular passageway 114 of the second heat exchanger B and a like outer annular passageway 115 of the third heat exchanger C. This latter passageway is connected by a pipe 118 with the top of the column E for flow of effluent or waste gases from the column during the distillation period. But since the expansion valve 106 is kept closed during the cooling down period no air reaches the top of the column and no rectification occurs in the column during this period. Hence there is no flow of effluent from the column through exchanger C and pipe 112 to the T 110. Indeed, because of this closure of the expansion valve 106 no flow whatever can occur in pipe 112 in the direction toward the third exchanger C. As a result the air reaching T 110 flows in the other direction through pipe 112 into the annular passageway 114 of the second heat exchanger B and thence moves along a pipe 116 to the valve chamber 40. The air leaves this chamber through outlet 54 and flows along branch 56a and pipe 56 into the outer annular passageway 14 of the first heat exchanger A. From the latter the air goes through pipe 12, branch 12b and the inlet 24 into the valve chamber 8 and is then discharged from the apparatus through the outlet 26.

Thus during the cooling-down period the air follows a limited path of flow through the first heat exchanger A, the expander D, the second heat exchanger B and back through the first heat exchanger A again. Its second passage through the first exchanger A is in a direction counter to that of its first flow through the unit. As before noted when starting up the air enters the first heat exchanger at about room temperature and at a pressure of from 150 to 175 p. s. i. When the air enters the expansion engine it is expanded and in so doing transfers its energy to the piston of the engine. This not only reduces the pressure of the air but substantially lowers its temperature. Since this cooler air leaving the expander flows back through the first heat exchanger the incoming air is cooled by the loss of heat to the colder outgoing air. This progressive cooling by heat transfer and by the energy given up by the air in the expander continues for about an hour or an hour and a quarter. By then the air leaving the expander has reached a temperature of about 103° K. or −274° F., and when this occurs the cooling-down period may be deemed at an end. Not only is the air leaving the expander at a very low temperature but all of the apparatus will have been cooled down to a point whereat the liquefaction period can be initiated.

This is done by cracking open the expansion valve 106 so that about 6% of the air will flow to the column E. This small quantity of air is not taken from the low pressure air leaving the expander but is taken from the high pressure air at T 84 ahead of the expander. This air flows from this T 84 through the pipe 81 which leads to an inner annular passageway 120 of the second heat exchanger B. In this pipe 81 are the open valve 85 and the T 86, the latter being connected by a pipe 126 with the second surge tank 102. A check valve 128 in this pipe 126 opens for flow from the surge tank but closes against flow in the opposite direction. The high pressure of the small quantity of air flowing in pipe 81 beyond the T 84 keeps this check valve 128 closed against any tendency of flow of the air at lower pressure leaving the expander and reaching the T 98. As a consequence the small quantity of high pressure air flows in one direction through the second heat exchanger while the low pressure air, which has passed through the expander and has been thereby cooled, flows in the opposite direction through the same exchanger. The transfer of heat from the high pressure air to the low pressure and colder air results in the liquefaction of the high pressure air which moves on through a pipe 130 to an air inlet manifold 132 at the bottom of the fractionating column E. From this manifold the air flows through a coil of tubes 133 in the boiler and then moves on through a pipe 134 to an inner annular passageway 136 through the third heat exchanger C, and thence along a pipe 138 to the expansion valve 106, previously referred to. This is the valve that is cracked open to initiate the liquefaction period. This slight opening permits the air to flow along a pipe 140, past T's 142 and 144 and an open valve 146, to enter the top of the column E wherein it trickles downward and collects in the space of the boiler around the coil of tubes therein.

As the level of the liquid air collecting in the boiler rises its changing level is indicated by a U-tube 148 containing a suitable indicating liquid and having connection with the lower part of the boiler through a pipe 150, and with the space above the boiler proper through another pipe 152. It takes from about three quarters of an hour to an hour to produce this desired quantity of liquid air in the bottom of the column before the rectification is begun.

The rectification is initiated by opening the expansion valve 106 somewhat wider. If the product is to be low pressure gaseous oxygen the valve 85 in pipe 81 and the valve 108 in pipe 100 are closed. This causes all of the air to pass from the T 84 through the surge tank 91, the expander D, and through the surge tank 102. It flows past the check valve 128 to T 86 and thence through pipe 81 into the inner annular passageway 120 of the second heat exchanger B. Thence it flows through pipe 130 into the coil of tubes in the boiler. The setting of the expansion valve 106 should be such as to establish a pressure of about 70 p. s. i. in the boiler coil. Under this pressure the air in the coil readily condenses and becomes wholly liquid, the heat given up during the condensation passing to the liquid air that has collected about the coil in the boiler.

The liquid air in the coil moves on through the third heat exchanger C to the expansion valve 106 and thence into the top of the column E whence it trickles down through and over suitable packing therein. The details of a preferred form of column are disclosed in a copending application, Serial No. 674,521, filed June 5, 1946, by Howard O. McMahon, now U. S. Patent 2,494,304. During this downward flow of the air and the upward flow of the vapors from the boiler the process of rectification takes place so that by the time the downflowing liquid reaches the boiler it is substantially pure oxygen and by the time the vapors reach the top of the column they consist largely of nitrogen, some argon and a slight quantity of oxygen. All this constitutes the so-called effluent which flows through pipe 118 into the outer annular passageway 115 of the third heat exchanger C. It flows therethrough in a direction counter to that of the liquid air flowing in the inner annular passageway 136.

The temperature of the effluent entering the third heat exchanger is about 86° K. or approximately −305° F. The temperature of the liquid air leaving the coil in the boiler and entering the third heat exchanger is about 98° K. or −283° F. Accordingly the liquid air gives up heat to the effluent as they both flow through the third heat exchanger and the air reaches the expansion valve 106 with a temperature of about 92° K. or −294° F.

The effluent moves from exchanger C through pipe 112 to one end of exchanger B for flow through the outer annular passageway 114, being then at a temperature approximating 96° K. or −286° F. The gaseous air from the expander D has a temperature of about 110° K. or −261° F. when it enters the other end of the second heat exchanger B. Consequently during its flow through this exchanger the air gives up heat to the effluent and reaches the coil in the boiler at a temperature of about 100° K. or −279° F. The effluent or waste gases flowing on through pipe 116 and the valve chamber 40 reach the first heat exchanger at a temperature in the neighborhood of 115° K. or −253° F. Since the compressed air comes to this exchanger at a temperature of say from 300° K. to 322° K., or from 80° F. to 120° F. it gives up heat to the counterflowing waste gases and is gradually cooled to about 135° K. or −234° F. for admission to the expander D. The waste gases finally leave the apparatus through the outlet 26 at close to room temperature.

Aiding in the cooling effect in the first and second heat exchangers A and B is the provision for the oxygen gas to flow through these exchangers. A pipe 154 upstanding in the boiler above the level of the liquid oxygen therein is the outlet for the substantially pure oxygen gas. This pipe extends through the manifold 132 and leads to a T 156 from which a pipe 158 connects with a central passageway 160 through the second heat exchanger B. From the latter a pipe 162 leads to a similar central passageway 164 through the first heat exchanger A. From the latter the oxygen gas leaves through a pipe 166 having a valve 168 controlling the delivery of the gaseous oxygen from the apparatus through the outlet 170.

During normal running of the apparatus the pressure of the compressed air entering the inlet 2 may be somewhat lower than is preferred during the cooling down period. A satisfactory operating range is from 120 to 150 p. s. i. and under some conditions the compressed air may have a pressure as low as 65 p. s. i. If 100 cubic feet of compressed air is supplied at about room temperature and within the range of pressure noted, then from 10 to 20 cubic feet of substantially pure oxygen gas 99.6% $O_2$ will be delivered at approximately room temperature with a pressure of about 5 p. s. i. This process of distillation may continue indefinitely. In the design of the apparatus operating pressures are so chosen as to produce at all times more refrigeration than is needed. If the level of liquid oxygen in the boiler tends to climb too high as a result of excessive refrigeration valve 85 in pipe 81 is opened slightly so that a fraction of the high pressure air by-passes the expander D. The total refrigeration effect decreases accordingly.

If high pressure oxygen gas is the product desired, a valve 172 in pipe 154 is closed and liquid oxygen is drawn from the boiler through a pipe 174 which has a T 176 and a valve 178 therein controlling a liquid oxygen outlet 180. Valve 178 is normally closed and so the liquid oxygen flows from T 176 through a valve 182 to a suitable pump F capable of producing any desired pressure up to say 3000 p. s. i. The liquid oxygen leaves the boiler at about 95° K. or −288° F. and leaves the pump at about 85° K. or −306° F. The pump may be driven by the expansion engine D or by any other source of power. It is maintained at a temperature of about 85° K. or −306° F. by a jacket or coil 184 through which the expanded liquid air is passed. This is accomplished by closing valve 146 in pipe 140 and opening valve 186 in a pipe 190 leading to the coil 184. From the latter the expanded air flows back to the T 144 through a pipe 192.

From the pump F the high pressure liquid oxygen flows through a pipe 194 to a T 196 and thence along a pipe 198 past an open valve 200 to the T 156. From this T the high pressure liquid oxygen flows through the second and first heat exchangers along the path of flow previously described for the low pressure oxygen gas. During its travel through the exchangers the liquid oxygen absorbs sufficient heat, especially in heat exchanger A, to convert it to gaseous oxygen which is delivered at the outlet 170 at the high pressure desired.

If only low pressure liquid oxygen is desired, valves 172 and 182 are closed and the liquid oxygen is drawn directly from the column through the pipe 174 and discharged through the outlet 180. Such liquid product will be at about 7 p. s. i. and a temperature close to 95° K. or −288° F. If the liquid oxygen is to be delivered at high pressure, valves 172, 178 and 200 are closed and valve 182 opened to admit the liquid oxygen to the pump F. It is increased to the desired pressure and delivered through pipe 194 to the T 196 whence it passes to a valve 202 and is discharged at an outlet 204.

With the several valves set as just described the yield of liquid oxygen or high pressure oxygen gas will be much less on a weight basis than the yield of low pressure gaseous oxygen because of the greater refrigeration requirements of these products. However, this yield can be substantially increased if the conditions of operation characteristic of the liquefaction period are approximated by opening wide the valves 85 and 108 and adjusting the expansion valve 106 to permit enough liquid air to enter the column E to secure the required purity of product.

In Fig. 2 there is disclosed a modification in the means beyond the heat exchanger A for controlling the flow of the air and the effluent. The modification consists in replacing the mechanically actuated valves 44 and 46 of Fig. 1 by a series of check valves so arranged that as the flow through the heat exchanger is altered by the operation of the valves 28 and 30 the pressure of the fluids themselves will determine their proper course to the T 84 and from the pipe 116.

Assuming that the mechanically operated valves 28 and 30 are in the positions shown in full lines, the air will flow from inlet 2, through the valve chamber 6 and thence through branch 18a and pipe 18 into the inner annular passageway 20 through the heat exchanger A. This passageway is connected by a pipe 206 with a T 208 from which a short pipe 210, containing a check valve 212, leads to another T 214 to which the pipe 116 is connected. From the T 208 a pipe 216 leads to still another T 218 from which a pipe 220 runs to the T 80. T 214 is connected with T 218 by a pipe 222 containing a check valve 224, a T 226 and another check valve 230. From the T 226 a third pipe 232 leads to the outer annular passageway 14 to heat exchanger A.

Air entering pipe 206 under relatively high pressure, as compared with that of the effluent, cannot pass on to pipe 116 because of the check valve 212 in pipe 210 between the T's 208 and 214. This check valve 212 opens for flow toward the heat exchanger and closes upon a tendency to flow in the reverse direction. In the pipe 216 is another check valve 234 which opens for flow toward the expander D or away from the T 208 but closes upon any flow toward this T or toward the heat exchanger A. In the cross pipe 222 the two check valves 224 and 230 open for flow in the direction from T 214 toward T 218 and close against flow in the reverse direction.

As the air enters pipes 206 and 210 it effects closure of the check valve 212 thereby preventing any flow of air onward and resisting any flow of the effluent from pipe 116. The air opens the check valve 234 and flows on through pipe 216 and pipe 220 to the T 80 and thence to the T 84. The pressure of this air in the end of the cross pipe 222 next to T 218 holds check valve 230 closed. This stops both flow of air and flow of effluent past this valve. The effluent coming through pipe 116 cannot flow beyond check valve 212 in pipe 210, as already noted, but can open check valve 224 in the cross pipe 222 and flow thence through the T 226 and pipe 232 to the annular passageway 14 of the heat exchanger. Also as previously noted, the effluent cannot get past check valve 230 which is held seated by the higher air pressure upon it from pipe 216.

Upon the shifting of the valves 28 and 30 to the right ends of chambers 6 and 8 air will flow from the inlet 2 through the chamber 6 into branch 12a and thence through pipe 12 into the outer annular passageway 14 of the heat exchanger A. It will then pass upward in the pipe 232 to the T 226 and into cross pipe 222. Its pressure will seat the check valve 224 and hold it closed against the lower pressure of the effluent from pipe 116 but will open the check valve 230 to permit the air to flow to T 218 and through pipe 220 to the T 80. The air pressure thus effective in the pipe 216 will keep the check valve 234 seated. The effluent coming through pipe 116 and into pipe 210 will open and flow past the check valve 212 into pipe 206 and thence to the inner annular passageway 20 through the heat exchanger A. The effluent cannot pass beyond check valves 224 and 234 because both are held closed by the air pressure on their opposite sides.

Thus in the modified arrangement shown in Fig. 2, the same interchange of flow of gases to be processed and waste gases occurs in the two annular passageways 14 and 20 through the heat exchanger A, and the pure gas always flows in the pipe 162 and through the central passageway 164 through the exchanger A.

The importance of this interchange of flow is appreciated when it is realized that as the compressed air passes through the first heat exchanger A certain of its components are condensed and deposited on the internal surfaces of the passageway through which the air is moving. This occurs because the effluent or waste gases absorb so much heat from the air flowing in the opposite direction in the closely adjacent annular passageway that the components of substantially higher boiling point are reduced in temperature below the condensation point. The water vapor in the air is the first such component to be condensed and a deposit thereof soon begins to collect in the passageway. Somewhat beyond, the temperature conditions are such that the carbon dioxide in the air will likewise condense and begin to gather on the surfaces in the passageway. These deposits would in time clog the passageway and reduce the flow of the air to a prohibitive extent and finally shut it off altogether. The clogging is avoided by the present invention.

During the flow of the waste gases through the passageway in which the air has been flowing and in which the deposits have accumulated, the waste gases evaporate, sublimate or otherwise remove the deposited components and carry them off through the outlet 26, thus cleaning the passageway and preparing it for the next shifting of the valves and interchange of flows. Accordingly not only does the periodic interchange of flows prevent the clogging or plugging of the passageways but in the particular use of the invention in connection with the production of oxygen, the purity of the latter is from the outset made more readily attainable since some of the undesired components of the air are removed therefrom during the initial flow of the air through the first heat exchanger. Thus the apparatus is especially efficient in supplying oxygen, either in the gaseous or liquid state, in a substantially pure condition.

The duration of the periods between interchange of flows must be such that substantially equal weights of gases are passed during each period. In other words, it is advantageous for the total weight of gas flowing during one period to be equal to that flowing during the preceding period in order to remove completely the deposits condensed from the gas to be processed. Accordingly, it is preferred to actuate the switching valves in response to a gas volume meter through which is passed either the gas to be processed or the waste gases. By this means the flows are interchanged periodically, the duration of each period being determined by the volume of gas which has passed through the meter during the period. The expansion engine herein described is a special kind of gas volume meter and accordingly it may conveniently be used to actuate the switching valves in the manner already hereinbefore indicated.

In order to remove the deposits collected during any period by the returning gases during the following period, it is necessary to adjust conditions of temperature and pressure so that the evaporative capacity of the returning stream is greater than that of the entering stream. The evaporative capacity of a certain mass of gas is determined by the pressure and temperature of the gas, or alternatively by its volume and temperature, or again alternatively by its pressure and volume. In other words, any two of the three conditions of pressure, temperature and volume are sufficient to determine the evaporative capacity of a certain mass of gas. For the sake of clearness the conditions of pressure and temperature will be discussed.

For a given mass of gas at a given temperature the evaporative capacity is inversely proportional to the pressure. In other words, as the pressure is decreased the evaporative capacity for a condensed component is increased proportionately. Thus if a mass of compressed gas is cooled until condensable components begin to separate out, and if the pressure is then decreased keeping the temperature constant, the condensable components will evaporate. In order for the clean-up system as herein described to function properly the pressures of the gas to be processed and the waste gases must be such as to insure complete removal of the condensed deposits.

In some cases it may be necessary to add or to subtract heat at one or more locations along the heat exchanger in order to provide suitable temperature conditions for the complete removal of the deposits. The evaporative capacity of a certain mass of gas at constant pressure depends upon the temperature in two distinct ways. As the temperature is increased the volume increases in direct proportion to the absolute temperature; hence the evaporative capacity increases correspondingly. Superimposed upon this effect is the condition that the vapor pressure of the condensed deposit also increases with temperature, generally according to the approximate mathematical law $$\log p = -\frac{C}{T} + b$$

where C and b are constants characteristic of the deposit and where T is the absolute temperature and log p is the logarithm of the vapor pressure of the deposit. The overall effect of changing the temperature of a system comprised of a certain mass of gas in equilibrium with a condensed deposit is to increase the evaporative capacity of the gas much more rapidly than the first power of the temperature.

In some instances it may occur that the conditions of pressure and temperature which naturally arise in a heat exchanger are not favorable for the complete removal of the deposits. In such cases pressures or temperature must be artificially adjusted to meet the conditions specified in the foregoing. Thus it may be necessary to introduce or withdraw heat artificially at certain regions along the length of the heat exchanger.

Thus in the production of oxygen from atmospheric air, if the air pressure is not sufficiently high, substantial deposits of carbon dioxide may be formed along such a considerable length of the heat exchanger that the evaporative capacity of the returning waste gases is not sufficient to remove the deposits completely.

One way of overcoming this disability is to compress the air to a higher pressure so that the deposits of carbon dioxide form at a higher temperature. Another way of overcoming the disability is to recirculate at least a portion of the compressed air over that region of the heat exchanger at which the carbon dioxide deposits occur, after the compressed air has emerged from the heat exchanger and before it has gone to the expansion engine. This arrangement results in artificially cooling the heat exchanger at the region where carbon dioxide is normally deposited and extends the deposit region towards the warm end of the exchanger where the evaporative capacity of the returning waste gases is sufficient to remove the deposits.

This latter arrangement is shown in Figs. 1 and 2 where the pipe 87, containing valve 87a, leads from the T 80 to a coil 88 wrapped around the upper or colder end of the heat exchanger A. From this coil the pipe 89 leads to the T 83 in the pipe 81. By a suitable setting of the valve 82 part of the compressed air flowing from the heat exchanger A will pass through the pipe 87, coil 88 and pipe 89 to the T 83 whence it joins with the air passing through valve 82 on its way to T 84 and the expander D. The compressed air flowing in coil 88 cools this region of the heat exchanger and because of this the carbon dioxide is deposited on the walls of the exchanger at a point nearer the end of the exchanger where the relative warm compressed air enters it. By thus causing the deposits of carbon dioxide to occur ahead of where they would accumulate if the coil 88 were not employed, the deposits are more readily taken up by the waste gases since their evaporative capacity becomes greater as they proceed through the heat exchanger. If under certain conditions the function of coil 88 is not deemed necessary, it can be rendered inactive by closing the valve 87a.

In Figs. 3 and 4 is shown a preferred form of heat exchanger which can be used for any or all of the heat exchangers A, B and C shown diagrammatically in Figs. 1 and 2. This heat exchanger comprises three thin walled tubes 238, 240 and 242 and two coils 244 and 246, and the necessary solder to bind the coils and tubes together. The innermost tube 238 constitutes the passageway 164 for the pure oxygen or whatever pure gas is being produced. Around this is wrapped the coil 244 which is formed by helically wrapping on edge a thin, flat, narrow strip of good heat conducting metal about an imaginary axis to form a sort of helical spring, and then helically winding this spring about the tube 238 as shown. At the same time a wire of solder 248 is laid between the convolutions of the coil next to the tube 238. With the ends of tube 238 plugged, the tube and assembled coil 244 are immersed in a solder bath for bonding the coil to the tube. Next the tube 240 is slipped over the coil 244 and then drawn through a die to shrink it into tight contact with the outer edge portions of the individual turns of the flat strip which makes up the coil 244. The passageway through the coil 244 between the tubes 228 and 240 is the inner annular passageway 20.

Another coil 246 of somewhat narrower thin flat metal is first helically wound on edge into spring-like shape and then helically wrapped about the intermediate tube 240, with a wire of solder 248 likewise interwound with it on the tube. With the ends of tube 240 also plugged the thus partly assembled exchanger is dipped into a solder bath to bond coil 246 to tube 240. During this immersion in the solder bath the solder in the annular passageway between tubes 238 and 240 remelts and bonds the coil 244 to both of these tubes. Then the outer tube 242 is slipped over the coil 246 and drawn through a die to shrink it tightly into contact with the coil 246. Thus is provided an outer annular passageway 14 through the coil 246 between the tubes 240 and 242. The entire assembly is then heated above the melting point of the solder to insure that both coils are tightly bonded to the tubes which they contact.

This manner of making up the heat exchanger insures that all the adjacent metal parts are in good heat-conducting contact with one another, and since the tubes 238, 240 and 242 have thin walls, the gases may be said to be in good thermal relation to one another. By following the proportions shown in the drawing (Figs. 3 and 4) the surface exposed to gas contact and the resistance to flow of gas is approximately equal in the inner annular passageway 20 and the outer annular passageway 14.

The amount of surface provided in the annular passageways and the relative weights of the gases to be processed and the waste gases flowing per unit of time dictate the proper length for the passageways to give the required efficiency of performance to produce the desired pure gas. The flow of the latter through the innermost passageway 164 aids in the cleaning performance because it cooperates in the exchange of heat and desirably lessens what would otherwise be a greater difference in temperature between the gases to be processed and the waste gases. By making the exchanger great in length relative to the diameter, the end where the raw gases are introduced may be at a temperature widely different from that of the other end and there will be no excessive leakage of heat along the exchanger. The heat exchange is effectively made between the gases flowing in the exchanger itself.

Although a heat exchanger as shown in Figs. 3 and 4 has proved highly efficient, it is to be understood that various embodiments of an exchanger can be used in the apparatus of Fig. 1. It is believed, however, that to obtain the best thermal performance the principles of construction underlying the preferred form of Figs. 3 and 4 should be followed, namely having the gases separated so far as possible by only a single wall having high heat conductivity, and in both flow passageways between which the interchange of flow is made having an extended metal surface packing in good thermal contact with the wall of the passageway. A heat exchanger constructed in accordance with these principles will perform the two important functions essential to the desired operation, namely, (1) a most efficient exchange of heat to insure the deposition of some of the components on the internal surfaces of a passageway through the exchanger and (2) the prompt and complete removal of these deposits so that the apparatus as a whole may continue to perform without loss of its effectiveness.

I claim:

1. Means for obtaining a gaseous product rich in oxygen from air wherein the air is compressed, cooled, expanded, liquefied and rectified, comprising a heat exchanger having three separated, thermally bonded passageways arranged in heat exchanging relation, one passageway being for flow of said air under pressure, a second passageway being for flow of the oxygen-enriched product resulting from the processing of said air, and the third passageway being for a waste gas resulting from said processing; an expansion engine for expanding said air after leaving said first passageway and prior to its separation into said oxygen-enriched product and said waste gas; valve means controlling the flows through the first and third passageways and being shiftable to alternate the flows between said first and third passageways of said air and said waste gas; and connections between said expansion engine and valve means for effecting the shifting of said valve means in response to the number of cycles of said expansion engine, whereby said valve means shift automatically after a predetermined volume of air has passed through said expansion engine.

2. Means for separating oxygen from air compressed to from 60 to 175 pounds per square inch, comprising a heat exchanger, an expansion engine, conduit means for leading said compressed air into said heat exchanger, conduit means for leading said compressed air from said heat exchanger to said engine, a second heat exchanger, conduit means for leading expanded gas from the exhaust outlet of said engine to said second heat exchanger, a fractionating column having a boiler including tubes through which the air from said second heat exchanger flows and a chamber surrounding said tubes and in which liquefied oxygen accumulates, conduit means for conducting oxygen from said chamber, and a third heat exchanger connected with said tubes, the said exchangers, engine and boiler being arranged in series so that all the air passes through them in continuous flow; the top of said fractionating column being connected with said third heat exchanger, and the three said heat exchangers being connected with one another, so that the effluent from said fractionating column passes into and through said third, second and first heat exchangers in that order and in a reverse direction of flow from that of said air.

3. In an apparatus for processing a gaseous mixture to separate it into a liquefied component and a gaseous product, the combination of a fractionating column, a boiler connected with said column to receive the liquefied component therefrom, heat exchange tubing in said boiler for receiving a cooled gaseous mixture and in which said gaseous mixture is liquefied by the liquefied component in said boiler, a heat exchanger having two passageways in heat exchanging relation, the inlet end of the first passageway being connected with the outlet end of said tubing to receive the liquefied gaseous mixture therein and the inlet end of the second passageway being connected with the upper part of said column to receive the gaseous product therefrom, a first conduit connecting the outlet end of said first passageway with the upper part of said column so as to discharge the liquefied gaseous mixture therein, a pump connected to said boiler for withdrawing said liquefied component therefrom, said pump having a cooling jacket, a branch conduit including a valve connecting said first conduit with the inlet of said jacket, and a return conduit connecting the outlet of said jacket with said first conduit.

4. A process for the liquefaction and rectification of air yielding a product gas and a waste gas, which comprises passing a stream of air compressed to not more than 175 p. s. i. through a first path in a heat exchange zone containing only three thermally bonded paths in heat exchange relation with each other along substantially the entire length thereof, flowing streams of product gas and waste gas derived from said air stream through the second and third paths, respectively, of said heat exchange zone in countercurrent relation to said air stream, thereby chilling said air stream and effecting deposition of moisture and carbon dioxide from said air stream in said first path, expanding thus chilled air with the performance of external work to produce refrigeration required in the process, liquefying and rectifying the expanded air to yield said product gas and waste gas, and periodically alternating the flows of said air and waste gas to said third and first paths, respectively, to remove moisture and carbon dioxide previously deposited in said first path.

5. A process for the liquefaction and rectification of air yielding an oxygen-rich gas and a waste gas, which comprises passing a stream of air compressed to not more than 150 p. s. i. through a first path in a heat exchange zone containing only three thermally bonded paths in heat exchange relation with each other along substantially the entire length thereof, flowing streams of oxygen-rich gas and waste gas at a pressure not more than 5 p. s. i. and derived from said air stream through the second and third paths, respectively, of said heat exchange zone in countercurrent relation to said air stream, thereby chilling said air stream and effecting deposition of moisture and carbon dioxide from said air stream in said first path, expanding thus chilled air with the performance of external work to produce refrigeration required in the process, liquefying and rectifying the expanded air to yield said oxygen-rich gas and waste gas, and periodically alternating the flows of said air and waste gas to said third and first paths, respectively, to remove moisture and carbon dioxide previously deposited in said first path.

6. A process for the liquefaction and rectification of air yielding an oxygen-rich gas at elevated pressure and a waste gas at near atmospheric pressure, which comprises passing a stream of air compressed to not more than 175 p. s. i. through a first path in a heat exchange zone containing three thermally bonded paths in heat exchange relation with each other along substantially the entire length thereof, flowing a stream at a pressure substantially higher than that of said air stream of oxygen-rich gas derived from said air stream, and a stream at a pressure substantially lower than that of said air stream of waste gas derived from said air stream, through the second and third paths, respectively, of said heat exchange zone in countercurrent relation to said air stream, thereby chilling said air stream and effecting deposition of moisture and carbon dioxide from said air stream in said first path, expanding thus chilled air with the performance of external work to produce refrigeration required in the process, liquefying and rectifying the expanded air to yield an oxygen-rich liquid and said waste gas, pumping said oxygen-rich liquid against a pressure substantially higher than that of said air stream to provide said oxygen-rich gas flowing through said second path, and periodically alternating the flows of said air and waste gas to said third and first paths, respectively, to remove moisture and carbon dioxide previously deposited in said first path.

7. An apparatus for separating mixed gases containing at least one condensable impurity into a product gas substantially free of condensable impurity and a waste gas containing condensable impurity, which comprises a first heat exchanger having three thermally bonded passageways in heat exchange relation with each other along substantially the entire length thereof, two of said passageways containing extended metal surface packing in thermal contact with the walls of said two passageways and having approximately equal resistance to gas flow, valve means connected to said two passageways to alternate the flows of said mixed gases and said waste gas therethrough, a fractionating column provided with a condenser-reboiler, an expansion engine connected to draw said mixed gases after passing through said first heat exchanger and to discharge the expanded mixed gases into conduit means leading to said column, a second heat exchanger connected to draw liquid from said condenser through one passageway thereof and to discharge said liquid into the upper portion of said column and to draw said waste gas from the upper portion of said column through another passageway thereof and to discharge said waste gas into conduit means leading to said valve means, and means for passing said product gas from said column to the third passageway of said first heat exchanger.

8. An apparatus according to claim 7 wherein the means for passing said product gas from said column includes a liquid pump drawing said product gas in liquid form from said column.

9. An apparatus according to claim 8 wherein the liquid pump includes a cooling jacket connected for circulating therethrough a fluid stream associated with said column.

10. In combination with a reversing heat exchanger having valve means to alternate periodically the flows of two different gas streams between two passageways of said reversing heat exchanger, gas volume metering means having a positive displacement member, connections for flowing a gas of said reversing heat exchanger through said metering means, and actuating means associated with said valve means to alternate the flows as aforesaid in response to the flow of a predetermined volume of gas through said metering means.

References Cited in the file of this patent

UNITED STATES PATENTS

| Re. 23,799 | Anderson | Mar. 16, 1954 |
| 1,394,955 | Von Recklinghausen | Oct. 25, 1921 |
| 1,584,772 | Hyde | May 18, 1926 |
| 1,602,535 | Le Rouge | Oct. 12, 1926 |
| 1,951,183 | De Baufre | Mar. 13, 1934 |
| 1,989,190 | Frankl | Jan. 29, 1935 |
| 1,996,519 | Levin | Apr. 2, 1935 |
| 2,084,987 | Borchardt | June 29, 1937 |
| 2,113,680 | De Baufre | Apr. 12, 1938 |
| 2,196,186 | Berg et al. | Apr. 9, 1940 |
| 2,209,748 | Schlitt | July 30, 1940 |
| 2,239,883 | De Baufre | Apr. 29, 1941 |
| 2,327,133 | Schuftan | Aug. 17, 1943 |
| 2,460,859 | Trumpler | Feb. 8, 1949 |
| 2,521,369 | Holm | Sept. 5, 1950 |
| 2,525,660 | Fausek | Oct. 10, 1950 |
| 2,529,013 | Gloyer | Nov. 7, 1950 |
| 2,552,557 | Jenny | May 15, 1951 |

FOREIGN PATENTS

| 113,331 | Great Britain | Aug. 21, 1917 |
| 469,943 | Great Britain | Aug. 3, 1937 |

OTHER REFERENCES

Alien Property Custodian Publication, 140,767, April 27, 1943.